United States Patent
Wiebe et al.

(10) Patent No.: US 7,356,012 B2
(45) Date of Patent: Apr. 8, 2008

(54) METHOD FOR TRANSMITTING INFORMATION

(75) Inventors: Linus Wiebe, Lund (SE); Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 914 days.

(21) Appl. No.: 10/329,420

(22) Filed: Dec. 27, 2002

(65) Prior Publication Data
US 2005/0076079 A1  Apr. 7, 2005

Related U.S. Application Data

(60) Provisional application No. 60/344,029, filed on Jan. 3, 2002.

(30) Foreign Application Priority Data
Dec. 27, 2001 (SE) ..................... 0104395

(51) Int. Cl.
*H04Q 7/24* (2006.01)
(52) U.S. Cl. ...................... 370/338; 709/203
(58) Field of Classification Search .............. None
See application file for complete search history.

(56) References Cited

U.S. PATENT DOCUMENTS

| | | | |
|---|---|---|---|
| 5,661,506 A | 8/1997 | Lazzouni et al. | |
| 5,852,434 A | 12/1998 | Sekendur | |
| 5,953,507 A | 9/1999 | Cheung et al. | |
| 5,978,856 A | 11/1999 | Jones | |
| 6,058,434 A | 5/2000 | Wilt et al. | |
| 6,246,683 B1 | 6/2001 | Connery et al. | |
| 6,345,304 B1* | 2/2002 | Dymetman et al. | 709/238 |
| 6,738,053 B1* | 5/2004 | Borgstrom et al. | 345/179 |
| 7,069,451 B1* | 6/2006 | Ginter et al. | 705/51 |
| 7,089,308 B2* | 8/2006 | Fransson et al. | 709/225 |
| 2003/0079037 A1* | 4/2003 | Donnelly et al. | 709/232 |

(Continued)

FOREIGN PATENT DOCUMENTS

EP    0836295 A2    4/1998

(Continued)

OTHER PUBLICATIONS

Dymetman, Marc and Max Copperman, "Intelligent Paper", Xerox Research Centre Europe, pp. 392-406; XP-002328425.

*Primary Examiner*—Brian Nguyen
(74) *Attorney, Agent, or Firm*—Birch, Stewart, Kolasch & Birch, LLP (57) ABSTRACT

The invention relates to a method of effecting in a computer system transmission of data between a digital user unit and a computer resource, the user unit being adapted to detect positions on a base which is provided with a part of a global position-coding pattern. The invention is characterized in that a request for access to a computer resource is received, using a first protocol stack, by the computer system from the user unit, said request containing a position indication, relating to which part of the global position-coding pattern that has been detected by the user unit. The computer system gains access to a computer resource using a communication mode and a second protocol stack. The communication mode is chosen based on the position indication. Only the second protocol stack comprises TCP/IP functionality, so that only data transmitted between the computer system and the computer resource comprises routing information.

19 Claims, 3 Drawing Sheets

U.S. PATENT DOCUMENTS

2004/0205525 A1* 10/2004 Murren et al. .............. 715/505

FOREIGN PATENT DOCUMENTS

| WO | WO 00/72286 A1 | 11/2000 |
| WO | WO 01/16691 A1 | 3/2001 |
| WO | WO 01/26032 A1 | 4/2001 |
| WO | WO 01/26033 A1 | 4/2001 |
| WO | WO 01/48591 A1 | 7/2001 |
| WO | WO 01/48685 A1 | 7/2001 |
| WO | WO 01/61449 A2 | 8/2001 |

* cited by examiner

METHOD FOR TRANSMITTING INFORMATION

This application claims priority on provisional Application No. 60/344,029 filed on Jan. 3, 2002, the entire contents of which are hereby incorporated by reference. This non-provisional application claims priority under 35 U.S.C. § 119 (a) on Patent Application No. 0104395-9 filed in Sweden on Dec. 27, 2001, which is herein incorporated by reference.

FIELD OF THE INVENTION

The invention relates to a method of effecting in a computer system transmission of data between a user unit and a computer resource.

BACKGROUND ART

The present invention is intended for use in connection with digital user units, preferably in the form of digital pens, which are capable of detecting positions on the basis of a position-coding pattern. If a user writes with such a pen on a base which is provided with the correct type of position-coding pattern, a sequence of positions is recorded, which constitutes a "digital copy" of the handwritten information written on the base.

Such a digital device can, by means of a short range radio link (such as a BLUETOOTH link), communicate with a computer system, for instance a personal computer (PC). This enables storing in the computer system of "digital copies" of the above type. Moreover such a connection allows interaction between the digital device and applications in the computer system. In addition to storing handwritten information, the user can by means of the user unit activate other functionalities in such applications.

For example, the user can, by marking with the user unit a certain area on a sheet of paper and thus detecting certain predetermined positions, initiate a function in an application in the computer system. Examples of such functions can be to process previously recorded handwritten information in a certain manner, send such information to a certain recipient etc. Thus, this affords the attractive possibility of using the user unit and a position-coded sheet (pen and paper) as a user interface for an application in a computer system.

In this context, there is a pronounced interest in letting the user unit interact also with other applications than those operating in precisely the computer system with which the user unit is in direct connection. For instance, a payment transaction, which a user initiates by filling in a position-coded form, may have to be recorded and checked in a central server unit belonging to a bank where the user is a customer.

There may thus be a need to establish connections between the user unit and computer resources, such as a server connected to the same LAN (Local Area Network) as the computer system or a server connected to the Internet. This could be carried out by using the computer system (PC) as a link between the user unit and these computer resources.

A first conceivable approach of achieving this is to let the computer system function as a client in relation to the desired computer resources. In such cases, the computer system (PC) initiates all communication with the various computer resources. The user unit (pen) contributes position information which causes client software in the computer system to act in a certain manner. In this case it may be said that the system acts "intelligently" since this is where position information is converted into functionality.

A drawback of such an approach is the difficulty of guaranteeing secrecy for the user who does not necessarily own and control the computer system (PC). For example, in safe transactions it is desirable to maintain transmitted information encrypted all the way between the pen and the computer resource used. Such an approach also makes it difficult to use the user unit offline, i.e. without direct contact with the computer system, and carry out recorded transactions on a later occasion when a contact has been established.

A second conceivable approach is to let the user unit function as a client and have the possibility of establishing on its own a packet switched connection with the required computer resource. The user unit can then on its own generate and receive data packets according to the TCP/IP protocols, which packets are only transmitted by the computer system to which the user unit is connected.

For a plurality of technical reasons, this second approach is difficult to accomplish. In most operating systems for personal computers, it is difficult to handle a plurality of TCP/IP transactions at the same time. Moreover it is complicated to allocate a (required) IP address from the computer system to the user unit. It may also be the case that the computer system acts behind a firewall and has proxy settings which are difficult for the user unit to access and without which no connection can be established. Similarly, it is difficult for the user unit to carry out DNS (Domain Name System) calls.

SUMMARY OF THE INVENTION

An object of the present invention is to wholly or partly eliminate the above problems.

According to a first aspect, the invention relates to a method of effecting in a computer system transmission of data between a digital user unit and a computer resource, where the user unit is adapted to detect positions on a base which is provided with a part of a global position-coding pattern. According to this aspect, the method is characterized in that that a request for access to a computer resource is received, using a first protocol stack, by the computer system from the user unit, said request containing a position indication relating to which part of the global position-coding pattern that has been detected by the user unit, and that the computer system gains access to a computer resource using a communication mode and a second protocol stack, wherein the communication mode is chosen based on the position indication, and wherein only the second protocol stack comprises TCP/IP functionality, such that only data transmitted between the computer system and the computer resource comprises routing information.

If such a method is used in the computer system, the user unit may function as a client while at the same time the computer system can adjust its communication mode to which part of the position-coding pattern is used. Different parts of the pattern imply that different resources are to be called and in different ways. The computer system establishes connections accordingly, but the client functionality is retained in the user unit, so that the connection can be used with maintained secrecy between user unit and computer resource.

Using TCP/IP functionality only in the second protocol stack results in simple and reliable communication between user unit and computer system/PC.

Preferably, the first protocol stack may comprise an HTTP-layer in connection with a layer emulating a serial port, and the user unit may act in a client-server mode, where the user unit constitutes the client and the computer resource constitutes the server. Preferably also, as the communication mode, a first communication mode may be chosen if the position indication indicates that a first part of the global position-coding pattern is utilized and a second communication mode may be chosen if the position indication indicates that a second part of the global position-coding pattern is utilized.

Preferably, the first communication mode comprises using a first set of protocol layers in the second protocol stack, and the second communication mode comprises using a second set of protocol layers in the second protocol stack. This enables dynamic use of protocol stacks depending on which part of the position-coding pattern is detected by the user unit.

Preferably, the second protocol stack in the second communication mode contains an additional protocol stack layer as compared with the second protocol stack used in the first communication mode. This entails more possibilities to adapt the communication mode in a manner that corresponds to the application for which it is used. Moreover, since the user unit normally will be battery operated, it may be advantageous to place energy consuming processes in the computer system.

Preferably, said request is an http request.

In a preferred embodiment, said indication comprises a URL. Such an embodiment can be easily implemented.

Alternatively, the indication can comprise one of the detected positions or a part thereof. This results in a more adaptive method.

In a preferred embodiment, the above additional protocol stack layer is a compression layer. This may be advantageous if the computer resource is reached via a narrowband communication channel, such as a mobile telephony system.

Alternatively, the additional protocol stack layer may be an encryption layer. This may be advantageous if the user unit itself cannot perform encryption, or if additional security measures are required.

In another preferred embodiment, the second communication mode is a point-to-multipoint communication mode. This allows the user unit to communicate with more than one computer resource simultaneously. This may provide, for instance, for backup functionality.

A variation of the first aspect of the invention relates to a method in a computer system of effecting transmission of data between a digital user unit and a computer resource, the user unit being adapted to detect positions on a base which is provided with a part of a global position-coding pattern, wherein a request for access to a computer resource is received by the computer system, said request containing a position indication relating to which part of the global position-coding pattern that has been detected by the user unit, and that the computer system, if the position indication relates to a predetermined part of the global position-coding pattern, gains access to a computer resource which corresponds to another user unit. This allows the e.g. PC to make possible also communication between user units.

Another variation of the first aspect relates to a method in a computer system of effecting transmission of data between a digital user unit and a computer resource, wherein the computer system communicates, using a first protocol stack, with the user unit and communicates with the computer resource using a second protocol stack, wherein only the second protocol stack comprises TCP/IP functionality, such that only data transmitted between the computer system and the computer resource comprises routing information.

Preferably, the user unit acts in a client-server mode, where the user unit constitutes the client and the computer resource constitutes the server.

Preferably, the computer resource is a remote server, and the computer system communicates with the user unit via a serial port or a radio interface which emulates a serial port.

This makes possible simple and reliable communication between a user unit and remote computer resource, and enables the user unit to act as a client in a client-server configuration without supporting TCP/IP-functionality.

According to a second aspect, the invention relates to a computer program for effecting in a computer system transmission of data between a digital user unit and a computer resource, the user unit being adapted to detect positions on a base which is provided with part of a global position-coding pattern. The invention is then characterized by instructions corresponding to the steps that a request for access to a computer resource is received, using a first protocol stack, by the computer system from the user unit, said request containing a position indication relating to which part of the global position-coding pattern that has been detected by the user unit, and that the computer system gains access to a computer resource using a communication mode and a second protocol stack, wherein the communication mode is chosen based on the position indication, and wherein only the second protocol stack comprises TCP/IP functionality, such that only data transmitted between the computer system and the computer resource comprises routing information.

Such a program can be stored on a digital memory medium or sent as a propagating signal, gives advantages corresponding to the above method, and may be varied similarly.

According to a third aspect, the invention relates to a system comprising a digital user unit, a computer resource adapted to communicate with the user unit, and a computer system for effecting transmission of data between the user unit and the computer resource, in which the user unit is adapted to detect positions on a base which is provided with part of a global position-coding pattern. The system is characterized in that the user unit comprises means for transferring, using a first protocol stack, a request for access to a computer resource to the computer system, that said request comprises a position indication relating to which part of the global position-coding pattern that has been detected by the user unit, and that the computer system comprises means for gaining access to a computer resource using a communication mode and a second protocol stack, wherein the communication mode is position indication dependent and only the second protocol stack comprises TCP/IP functionality.

This system gives advantages corresponding to the above method and may be varied similarly.

BRIEF DESCRIPTION OF THE DRAWINGS

FIG. 1b illustrates blocks in the computer system in FIG. 1a.

DESCRIPTION OF PREFERRED EMBODIMENTS

Figure 1A:
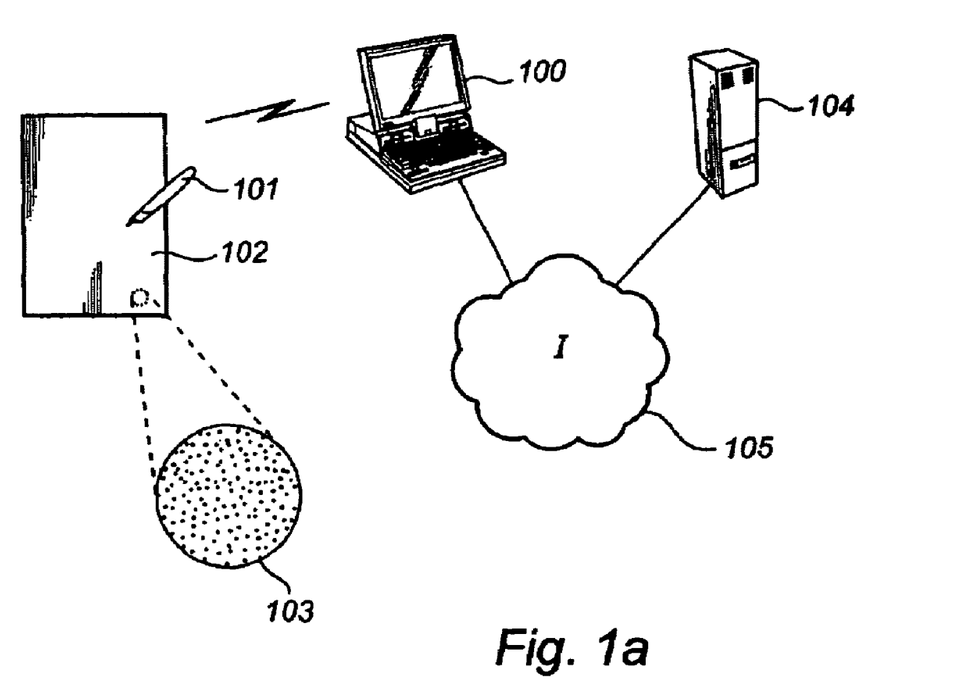
FIG. 1a shows an example of a system in which a method according to the present invention can be utilized.

FIG. 1a shows an example of a system in which a method according to the present invention can be utilized. The Figure shows a user unit 101 in the form of a digital pen of the type as disclosed in WO 01/26033, which is incorporated herewith by reference. The pen 101 is used for writing on a sheet of paper 102, which is provided with a position-coding pattern 103 (enlarged). This pattern 103 has the property that if a certain minimum part of the pattern 103 is recorded optically by means of an image sensor in the pen 101, the position of this part and, thus, the pen 101 in the total pattern can be detected. When writing using the pen 101, a sequence of absolute positions is thus recorded, which constitutes a digital copy of what is being written on the sheet 102. The present invention relates to a method of making a connection of such a user unit 101, or a similar type of user unit, to a computer resource, preferably in the form of a server unit 104 which is connected to a network. The connection can be established, for example, via the Internet 105. According to the present invention, use is made of a computer system, such as a personal computer 100, communicating with the user unit and also communicating with the server unit 104, via one or more networks, to establish connection for the portable, digital user unit. The user unit 101 and the computer system 100 can communicate by means of a short range radio link (cf. BLUETOOTH) or with an IR link, cable or the like. Thus the computer system is a link between the user unit and the computer resource.

According to a preferred embodiment of the invention, the user unit 101 includes a client functionality, such as http client software. Such software can initiate a client-server connection with a server unit. In such cases, the http client generates an http request. Such a request contains a URL which defines which server is to be contacted.

A position-coding pattern of the type disclosed in Applicant's Application WO 01/26033, which is herewith incorporated by reference, is capable of coding with great accuracy an area in the order of 4.6 million square kilometres, which corresponds to enormous amounts of A4 pages. This total surface can for instance be hierarchically divided, for example into a number of "segments" which in turn are divided into a number of "shelves". Each shelf may contain a number of "books", and each book a number of pages. A detected position in the position-coding pattern can be located to a certain page, which can be identified with the format 1.2.3.4 (segment=1.shelf=2.book=3.page=4), i.e. similarly to an IPv4 address, but without the same value restrictions.

It is to be noted that this relates to the abstract, global pattern. Of course, a physical sheet of paper can be printed piece by piece with fully separated, selected parts of this global pattern, i.e. with parts of different "abstract" pages.

Figure 1B:
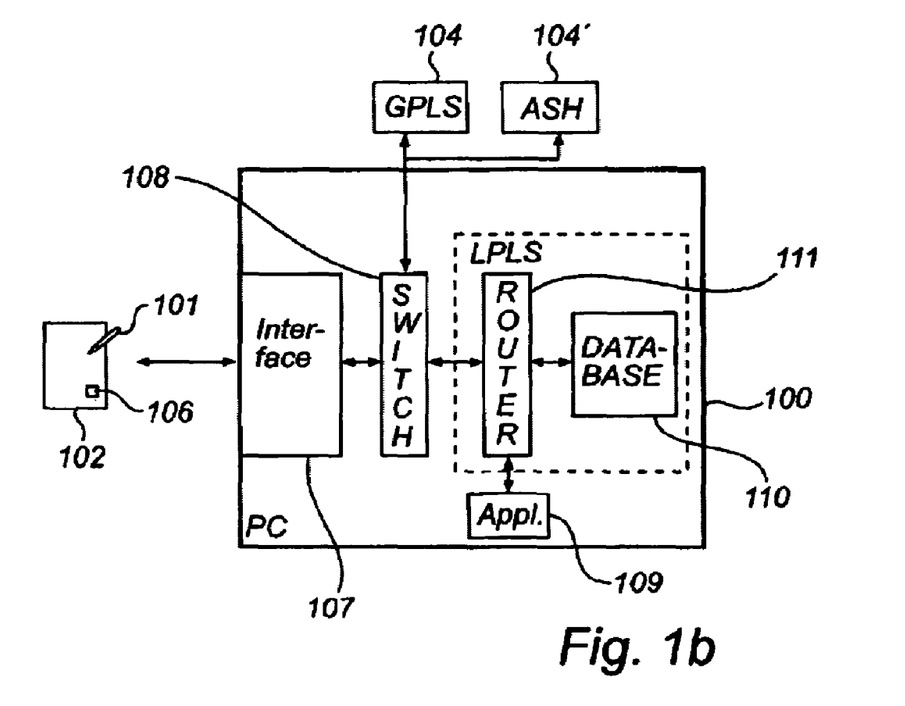

FIG. 1b shows blocks in the computer system 100 in FIG. 1a. There is shown an interface 107 with driver and adapter for the user unit 101, which interface makes the transmission method, used for user unit-computer system transmissions, transparent to the other parts of the computer system. The computer system 100 according to an embodiment of the invention further comprises a functional module designated "SWITCH" 108, which serves to enable position-indication-dependent communication between the user unit 101 and computer resources, such as remote servers 104, 104' and local applications 109, as will be described below.

The computer system 100 in FIG. 1b may be used in different scenarios. There is a possibility of reserving certain partial areas in the global pattern for specific applications or for specific users, as disclosed in Applicant's Application WO 01/48685, which is incorporated herewith by reference. For example, all pages in a certain book on a certain shelf in a certain segment can be reserved for the user "A". These pages can preferably be given certain properties, as desired by the user. The same applies to partial areas within the pages and individual positions on the pages. The properties may include rules as to how information, which is filled in, using a user unit 101, on physical sheets, provided with this part of the pattern, is to be interpreted.

When a user, for instance by marking an activation icon 106, begins to use a sheet of paper 102 which has been printed with this reserved part of the global pattern, the properties of this part of the pattern are not necessarily known to the user unit 102.

In a first scenario, these properties can be requested from a remote PLS server (PLS=Pattern Lookup Service). The PLS server may then optionally also charge users for the utilization of the sheet/pattern. Such a server can be global (GPLS), i.e. intended for all users of the global position-coding pattern, or local, i.e. intended for a small group of users.

In a second scenario, the PLS "server" may be entirely local (LPLS), which means that it is contained in the computer system 100. The local LPLS serves to direct requests and information from the user unit to various applications operating in the computer system (PC).

In the first scenario, a GPLS 104 can, in response to a request from a client, supply to the client, i.e. the user unit 101, an address to an application service handler (ASH) 104' which can function as a server in a certain part of the pattern. The user unit 101 then communicates with the ASH 104' for performing desired functions.

In the second local scenario, where the computer system receives a "local URL", i.e. where the user unit sends a request to a local application operating in the computer system, a database 110 included in the LPLS may supply address instructions to a local router 111 included, which transmits data from the user unit to the correct local application (appl.) 109 in the computer system 100. Then communication occurs between the user unit 101 and the application 109. A requested computer resource may thus relate to an external server, for instance GPLS or ASH, an LPLS or some other local application in the computer system. It should be noted that the term "user unit" may essentially also relate to a process in the computer system, i.e. a virtual user unit.

The user unit 101 can, depending on which part of the pattern has been detected, select the PLS server which is to be contacted. Thus the user unit 101 can initiate a pattern-dependent communication.

According to the present invention, also communication modes can be changed in the computer system 100 (for instance a PC), via which communication takes place, depending on which partial area of the global position-coding pattern has been detected by the user unit 101.

Such a partial area can relate to, for example, a certain segment or a certain shelf in a certain segment. It does not have to involve a contiguous area. It may involve, for example, certain pages in all books on a certain shelf in a certain segment.

The module 108 in the computer system 100 which enables this pattern-area-dependent communication can be designated proxy or switching unit.

Figure 2:
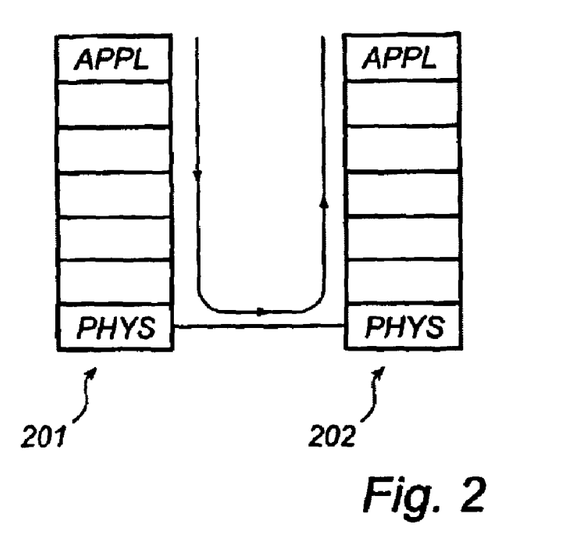
FIG. 2 illustrates the concept of protocol stack.

FIG. 2 illustrates the term "protocol stack". The figure shows protocol stacks for two devices 201, 202 communicating with each other, according to the OSI (Open Systems Interconnection) model that is well known to those skilled in the art. This model is used to describe the function of a communication system. In the original OSI model, seven different layers were defined, numbered from below and up. However, in most cases the model is shown with a smaller number of separate layers. In the lowermost layer, it is defined how the communication proceeds physically (for instance which voltage levels represent "1" and "0" in transmission by wire) for a non-structured bit stream which is transferred via a medium. In layers higher up in the model, more comprehensive functionalities are defined, such as synchronizing, setting up and terminating connections, and error control etc. The higher layers relate to definitions of the application that effects the communication, for instance browser software in a personal computer.

The amount of data that is to be sent by an application (high up in the model) in a first device, such as a computer system, can in general terms be called payload. When such data is to be transmitted, it is moved down in the model, whereby the functionalities in the different layers to a varying degree add what is referred to as overhead, i.e. data which in a layer is added to the data set coming from above, so as to allow the functions that are provided in the layer. For instance, a payload data stream may be divided into packets, each of which is provided with a header, to be used in forwarding the packet. In the lowermost layer, the two devices communicate with each other and there the data is transferred. The data received in the second device 202 is moved upwards in this protocol stack until it is received by the corresponding application in the second device.

It may be generally said that a given layer in the protocol stack of the model makes the layers below transparent to the layers above. For two devices to communicate with each other, it is necessary for all layers in their respective protocol stacks to conform in pairs.

Figure 3:
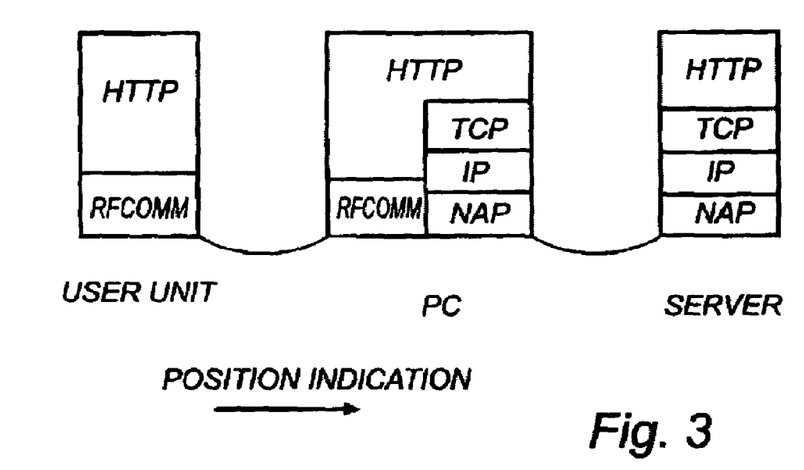
FIG. 3 illustrates a connection and a communication mode according to an embodiment of the present invention.

FIG. 3 illustrates a connection according to an embodiment of the present invention. The figure shows protocol stacks of a user unit, of a computer resource/server, with which the user unit intends to communicate, and of an intermediate computer system (PC), via which the communication is intended to take place. Between the PC and the user unit, the communication takes place according to the BLUETOOTH standard and, more specifically, according to the RFCOMM specification which emulates a serial port. According a preferred embodiment of the invention, the HTTP client is put directly over RFCOMM, i.e. no TCP/IP layers are present in these protocol stacks. Thus no routing information is used in this link, which relates to a point to point connection. This mode of communication between user unit and computer system can be utilized also where the communication mode of the computer system is not dependent on the position-coding pattern.

For the communication between the PC and the server, use is made in the ordinary way of protocol stacks where an HTTP application is superimposed with a TCP (Transmission Control Protocol) layer which is superimposed with an IP (Internet Protocol) layer which is superimposed with an NAP (Network Access Protocol) layer. The NAP layers in the server and the PC do not have to conform with each other if one or more routers (not shown) are placed between them.

Summing up, the function can be such that the user unit generates an HTTP request which is to be transmitted to the server. The request is received by the PC which reads the URL in the request (for instance pls.anoto.com) and makes a DNS call to obtain the corresponding IP address. Then the PC generates TCP/IP packets (datagrams) which contain the request as payload.

It is to be noted that the computer system for communication with the user unit utilizes a first protocol stack and for communication with the computer resource utilizes a second protocol stack. Only the second protocol stack contains TCP/IP functionality so that only data which is transmitted between the computer system and the computer resource contains routing information which is necessary according to the TCP/IP protocol.

The above application in the PC which handles the communication can preferably be programmed as an HTTP proxy. Such a proxy functions as an application level gateway for a client.

According to an embodiment of the present invention, the application in the PC utilizes different communication modes depending on which part of the global position-coding pattern the user unit has detected. For instance, different sets of protocol stacks may be used for different parts of the pattern. For the PC to be able to choose the communication mode depending on which part of the pattern is indicated, a position indication must be transmitted from the user unit to the PC.

Transmission of Position Indication

In its simplest embodiment, transmission of a position indication takes place as follows. The user unit detects a position in the global position-coding pattern. The user unit interprets the position information in such manner that a certain server with a certain URL is to be contacted. This can be carried out, for example, by means of a lookup table. Preferably, the HTTP client creates in the user unit an HTTP request directed to the URL of the server in question. This request is sent to the computer system (PC) which reads the URL. Since this is dependent on which partial area in the position-coding pattern has been detected, such an indication has been transferred to the PC. Thus the indication can be a URL. This is the simplest way of transmitting a position indication to the computer system. However the computer system is not allowed to utilize a plurality of separate position-dependent communication modes with one and the same server since the position indication consists of the URL thereof.

According to an alternative embodiment therefore, the position indication can be transferred separately, for instance in the form of a position or part of a position. A complete position can be created as "segment.shelf.book.page/x,y" (1.2.3.4/00556, 10124) where x and y define local coordinates within the page. In most cases part of a position is sufficient, for instance "segment.shelf" (1.2.*.*), which defines a large area. It is also possible to transfer the indication "book" (*.*.3.*) which defines a plurality of non-contiguous areas in the pattern.

Communication Methods

Figure 4:
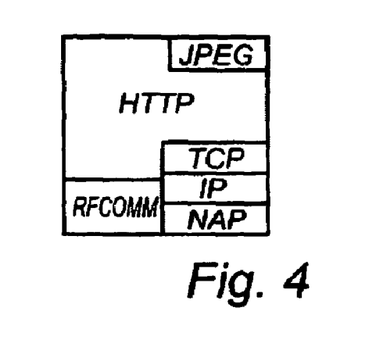
FIG. 4 shows a first example of an alternative communication mode in a computer system.
Figure 5:
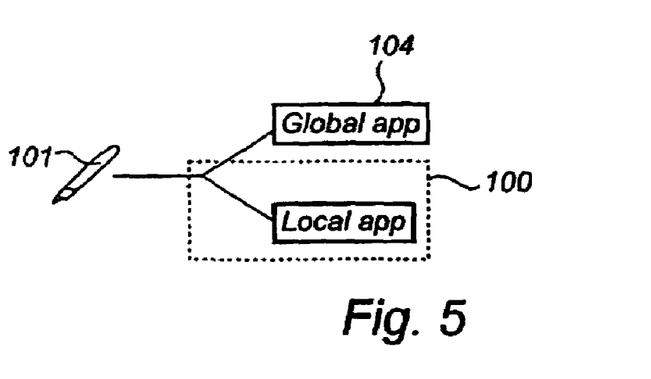
FIG. 5 shows a second example of an alternative communication mode in a computer system.
Figure 6:
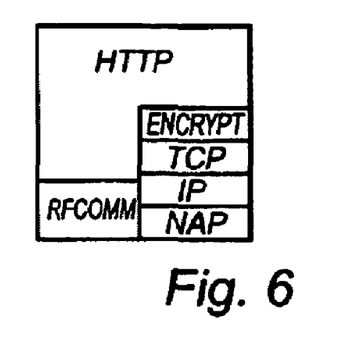
FIG. 6 shows a third example of an alternative communication mode in a computer system.

A communication mode may also be called a communication method. An example of a communication mode is shown in FIG. 3. FIGS. 4-6 now illustrate variants of the communication modes of the computer system (PC) which are selectable on the basis of which part of the position-coding pattern has been detected.

FIG. 4 shows a first example of an alternative communication mode in a computer system. Here, compared with FIG. 3, a compression layer has been added. This has been made because the computer system has received a position indication which implies that compression is to take place. In the example shown, JPEG compression of image information is thus carried out. This image information may be transferred from the user unit, resident on the computer system (PC), or retrieved from any computer resource. Compression may be advantageous if data is to be transferred via a narrowband channel, e.g. if data is to be transmitted from the computer system to a computer resource via a mobile telephony system. Further, compression algorithms are generally calculation intensive and, thus, energy intensive. When the image information originates from the user unit, it may therefore be advantageous to perform such compression in the computer system instead of in the usually battery operated user unit.

FIG. 5 shows a second example of an alternative communication mode in a computer system. Here simultaneous communication with two separate computer resources takes place. The user unit 101 then operates against a local application in the computer system while at the same time a global server records transactions performed. A backup copy is then stored in an additional place. Like in FIG. 4, this takes place if a certain area in the position-coding pattern has been detected. Thus, in this case the received position indication indicates that the computer system should in general communicate in a point to multipoint fashion. The primary information sent to a first computer resource is mirrored onto another computer resource as secondary information. It should be noted however that the second information need not be entirely identical with the primary information.

For instance, if a user device operates vis-à-vis a local application in a PC, the information which is sent in requests to the local application will form the primary information. In a mirroring communication mode, secondary information corresponding to the primary information may be sent for instance to a remote server, e.g. for backup or billing purposes (e.g. for charging the user for the use of a part of the global position-coding paper that is connected to a specific service). The secondary information may, for instance, be compressed and encrypted. Another option is to filter the secondary information in order to avoid that certain information leaves the PC/computer system or in order only to mirror e.g. billing-specific information.

FIG. 6 shows a third example of an alternative communication mode in a computer system. Here, compared with FIG. 3, an encryption layer has been added. This has been made since the computer system has received a position indication which implies that additional encryption is to take place.

Figure 7:
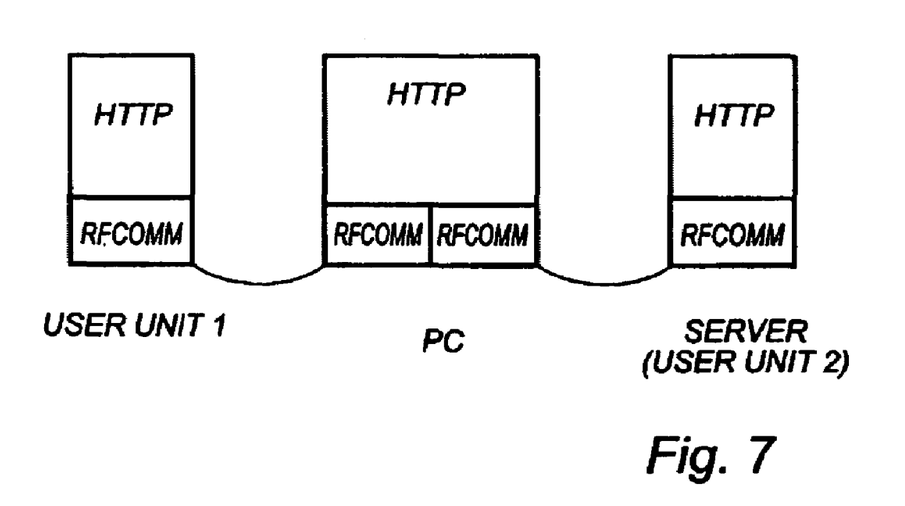
FIG. 7 shows a fourth example of an alternative communication mode in a computer system.

A further possibility of adjusting the communication mode is, compared with FIG. 3, to remove layers from a protocol stack. For example, the computer system may arrange a communication path between two user units, one functioning as a server and the other as a client, as is indicated in FIG. 7. Then the computer system may have two protocol stacks such as the left protocol stack in the computer system in FIG. 3. The first user unit (USER UNIT 1) acts as a client and the second user unit (USER UNIT 2) acts as a server. The client server relationship may be switched during the communication. The first and second user units communicate via a computer system (PC), and use protocol stacks where an HTTP-layer is in direct contact with a layer emulating a serial port, such as an RFCOMM-layer. In this case none of the protocol stacks thus involve a TCP/IP-layer, since no network addressing functionality is needed.

The communication modes of the computer system may be varied also in other ways than changing the protocol stacks. For example, the selection of port for different types of communication may be adjusted depending on which part of the position-coding pattern has been detected.

Figure 8:
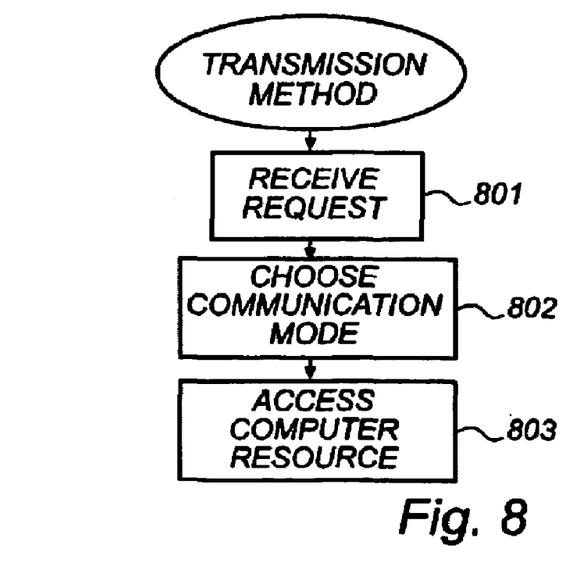
FIG. 8 shows a flow chart illustrating a method according to the invention.

FIG. 8 shows a flow chart illustrating a method according to the invention. The method is performed in a computer system, such as a PC. In a first step a request for access to a computer resource is received 801 from a user unit, wherein the request contains a position indication relating to a position coding pattern. In a second step a communication mode is chosen 802, based upon the received position indication. The communication mode may be chosen for instance by means of a lookup table, which is stored either in the computer system itself or on a remote server. In a third step the computer resource, which was requested by the user unit, is accessed using the chosen communication mode.

It should be noted that the feature with position indication dependent communication modes could be used with any protocol stack arrangement, i.e. also where TCP/IP-layers are used between the user unit and the computer system. Hence, in an embodiment, the invention relates to a method of effecting in a computer system transmission of data between a digital user unit and a computer resource, where the user unit is adapted to detect positions on a base which is provided with a part of a global position-coding pattern, wherein the computer system receives from the user unit a request for access to a computer resource, wherein said request contains an indication concerning which part of the global position-coding pattern has been detected by the user unit, wherein the computer system gains access to a computer resource while utilizing a first communication mode if the indication indicates that a first part of the global position-coding pattern has been detected, and wherein the computer system gains access to a computer resource while utilizing a second communication mode if the indication indicates that a second part of the global position-coding pattern has been detected.

The invention is not restricted to the above described embodiments. It may be varied within the scope of the appended claims.

The invention claimed is:

1. A method in a computer system of effecting transmission of data between a digital user unit and a computer resource, the method comprising:
   detecting positions on a base which is provided with a part of a global position-coding pattern by utilizing the user unit;
   receiving, a request for access to the computer resource using a first protocol stack, by the computer system from the user unit, said request containing a position indication relating to which part of the global position-coding pattern that has been detected by the user unit; and
   gaining access to the computer resource using a communication mode chosen from a plurality of communication modes and a second protocol stack, wherein the communication mode is chosen based on the position indication, and wherein only the second protocol stack comprises TCP/IP functionality, so that only data transmitted between the computer system and the computer resource comprises routing information.

2. The method as claimed in claim 1, in which, the first protocol stack comprises an HTTP-layer in connection with a layer emulating a serial port, and wherein the user unit acts in a client-server mode, where the user unit constitutes the client and the computer resource constitutes the server.

3. The method as claimed in claim 1, in which, as the communication mode, a first communication mode is chosen if the position indication indicates that a first part of the global position-coding pattern is utilized and a second communication mode is chosen if the position indication indicates that a second part of the global position-coding pattern is utilized.

4. The method as claimed in claim 3, wherein the first communication mode comprises utilizing a first set of protocol layers in the second protocol stack and the second communication mode comprises utilizing a second set of protocol layers in the second protocol stack.

5. The method as claimed in claim 3, in which the second protocol stack in the second communication mode contains an additional protocol stack layer as compared with the second protocol stack used in the first communication mode.

6. The method as claimed in claim 5, in which the additional protocol stack layer is a compression layer.

7. The method as claimed in claim 5, in which the additional protocol stack layer is an encryption layer.

8. The method as claimed in claim 3, in which the second communication mode is a point-to-multipoint communication mode.

9. The method as claimed in claim 1, in which said request is an HTTP request.

10. The method as claimed in claim 1, in which said indication comprises a network address, wherein the network address includes a URL.

11. The method as claimed in claim 1, in which said indication comprises one of said positions.

12. The method as claimed in claim 1, in which said indication comprises a part of one of said positions.

13. A method in a computer system of effecting transmission of data between a digital user unit and a computer resource, the method comprising:
    detecting positions on a base which is provided with a part of a global position-coding pattern, by utilizing the user unit;
    receiving a request for access to the computer resource by the computer system, said request containing a position indication relating to which part of the global position-coding pattern that has been detected by the user units; and
    gaining access to the computer resource which corresponds to another user unit, if the position indication relates to a predetermined part of the global position-coding pattern.

14. A method in a computer system of effecting transmission of data between a digital user unit and a computer resource, the method comprising:
    communicating with the user unit using a first protocol stack, wherein the user unit initiates a pattern-dependent communication based on which part of a global position-coding pattern that has been detected by the user unit; and
    communicating with the computer resource using a second protocol stack, wherein only the second protocol stack comprises TCP/IP functionality, so that only data transmitted between the computer system and the computer resource comprises routing information.

15. A method according to claim 14, wherein the user unit acts in a client-server mode, where the user unit constitutes the client and the computer resource constitutes the server.

16. A method according to claim 14, wherein the computer resource is a remote server, and where the computer system communicates with the user unit via a serial port or a radio interface which emulates a serial port.

17. A computer-readable medium encoded with a computer program having computer executable instructions for effecting in a computer system transmission of data between a digital user unit and a computer resource, the computer program when executed causes the computer system to perform the steps of:
    detecting positions on a base which is provided with a part of a global position-coding pattern;
    receiving a request for access to the computer resource, using a first protocol stack, by the computer system from the user unit, said request containing a position indication relating to which part of the global position-coding pattern that has been detected by the user unit; and
    gaining access to the computer resource using a communication mode chosen from a plurality of communication modes and a second protocol stack, wherein the communication mode is chosen based on the position indication, and wherein only the second protocol stack comprises TCP/IP functionality, so that only data transmitted between the computer system and the computer resource comprises routing information.

18. The computer-readable medium as claimed in claim 17, wherein the computer-readable medium is a digital memory medium.

19. A system comprising a digital user unit, a computer resource configured to communicate with the user unit, and a computer system for effecting transmission of data between the user unit and the computer resource, in which the user unit is configured to detect positions on a base which is provided with a part of a global position-coding pattern, wherein the user unit comprises means for transferring, using a first protocol stack, a request for access to the computer resource to the computer system, that said request comprises a position indication relating to which part of the global position-coding pattern that has been detected by the user unit, and that the computer system comprises means for gaining access to a computer resource using a communication mode chosen from a plurality of communication modes and a second protocol stack, wherein the communication mode is position indication dependent and only the second protocol stack comprises TCP/IP functionality.

* * * * *